United States Patent [19]
Fisher

[11] 3,827,094
[45] Aug. 6, 1974

[54] INFLATABLE LIFE RAFT ESCAPE SLIDE
[75] Inventor: John M. Fisher, Cuyahoga Falls, Ohio
[73] Assignee: The B. F. Goodrich Company, New York, N.Y.
[22] Filed: June 25, 1973
[21] Appl. No.: 373,120

[52] U.S. Cl. .................. 9/11 A, 182/48, 193/25 B, 244/137 P
[51] Int. Cl. ........................ B63c 9/04, B64d 25/14
[58] Field of Search .......... 244/137 P; 9/11 A, 2 A; 193/25 B; 182/48, 20; 14/27; 52/2, 224

[56] References Cited
UNITED STATES PATENTS

| | | | |
|---|---|---|---|
| 2,399,494 | 4/1946 | Manson et al. | 9/11 A |
| 2,531,549 | 11/1960 | Boyd | 9/11 A X |
| 2,577,582 | 12/1951 | Hammitt et al. | 52/22 S X |
| 2,888,690 | 6/1959 | Shaw | 9/11 A |
| 3,222,700 | 12/1965 | Smith | 9/11 A |
| 3,339,218 | 9/1967 | Stamberger | 9/11 A |
| 3,458,009 | 7/1969 | Favors | 182/48 |
| 3,464,515 | 9/1969 | Evans | 182/20 |
| 3,473,641 | 10/1969 | Fisher | 193/25 |
| 3,669,217 | 6/1972 | Fisher | 182/48 |
| 3,679,025 | 7/1972 | Rummel | 182/20 |

FOREIGN PATENTS OR APPLICATIONS

| | | | |
|---|---|---|---|
| 1,206,936 | 9/1970 | Great Britain | 182/48 |

*Primary Examiner*—Trygve M. Blix
*Assistant Examiner*—Galen L. Barefoot
*Attorney, Agent, or Firm*—Joseph Januszkiewicz

[57] ABSTRACT

An improved inflatable life raft escape slide having a plurality of inflatable tube members which, upon inflation, define an escape slide that is also usable as a life raft. A plurality of inflatable auxiliary tube members are cooperative with the escape slide which, upon inflation, deploys a canopy that protects the occupants of the slide raft when used as a raft.

3 Claims, 9 Drawing Figures

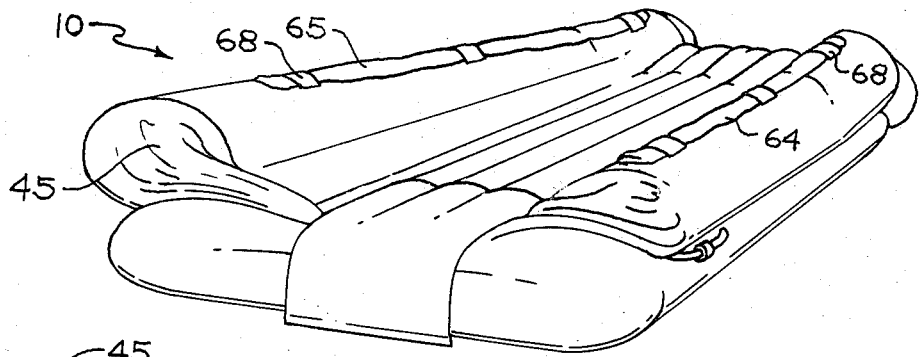
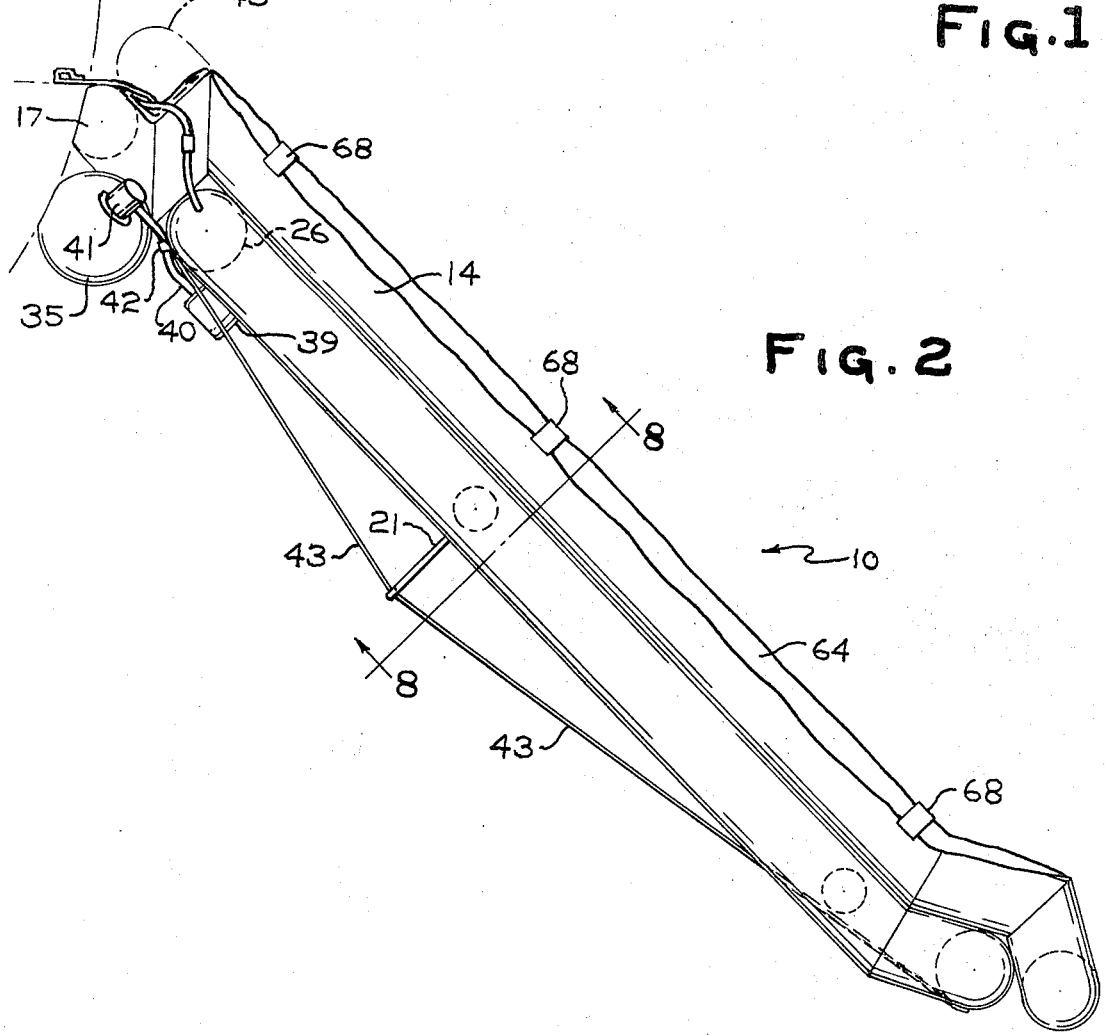

PATENTED AUG 6 1974 3,827,094
SHEET 3 OF 3

INFLATABLE LIFE RAFT ESCAPE SLIDE

BACKGROUND OF THE INVENTION

This invention relates to inflatable life raft escape slide and more particularly to an improved escape slide that is especially suitable for emergency evacuation of passengers from disabled aircraft and which slide may also be used as a life saving raft at sea, having a canopy that is deployed to protect occupants of the raft.

In the event of an aircraft emergency, such as a crash landing at sea, provision must be made for the safe evacuation of passengers from the aircraft and for their subsequent safety at sea until emergency rescue work can be effected. To date, separate means have been used for each operation; however, in the instant invention it has been found feasible to provide an escape slide that doubles as a life saving raft that is stable and easily deployed. In addition, features are incorporated therein to provide the rapid deployment of a canopy to shelter and protect the occupants of the raft until rescue can be effected. Such canopy is formed integrally with the slide structure and does not require any additional appreciable space, being deployed instantly without any manipulation except to initiate the functional element of deployment. This unit does not require accessory kits which require considerable manipulation and instruction which are confusing in emergency situations.

SUMMARY OF THE INVENTION

The present invention contemplates an inflatable life raft escape slide that has a plurality of inflatable tube members cooperable with a deployable canopy, which structure is reinforced by strut-like means capable of supporting substantial loads yet not displacing a large amount of water to insure stability when used as a raft. The slide has a pusher tube connected to the upper end portion thereof to facilitate the deployment of the slide device from the aircraft.

BRIEF DESCRIPTION OF THE DRAWINGS

FIG. 1 is a perspective diagrammatic view of a life raft escape slide;

FIG. 2 is a side elevational view of the inflatable slide extending from the foot of an aircraft exit, shown in phantom lines;

DETAILED DESCRIPTION

Figure 3:
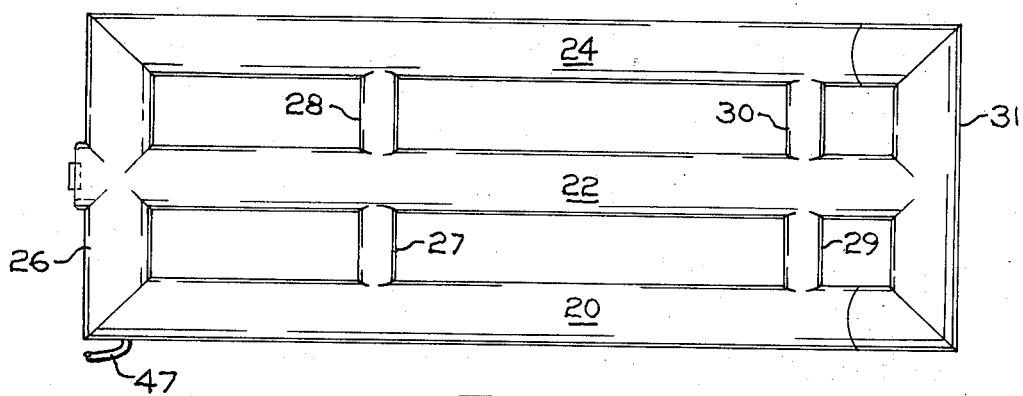
FIG. 3 is a fragmentary plan view of the lower section of the escape slide.
Figure 4:
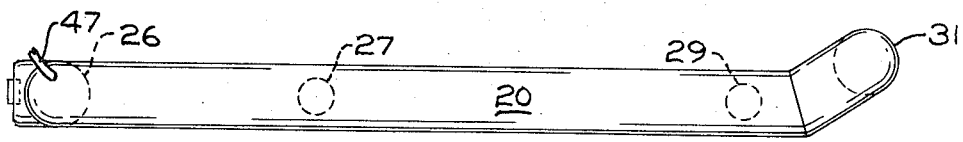
FIG. 4 is a fragmentary side elevational view of the lower section.
Figure 5:
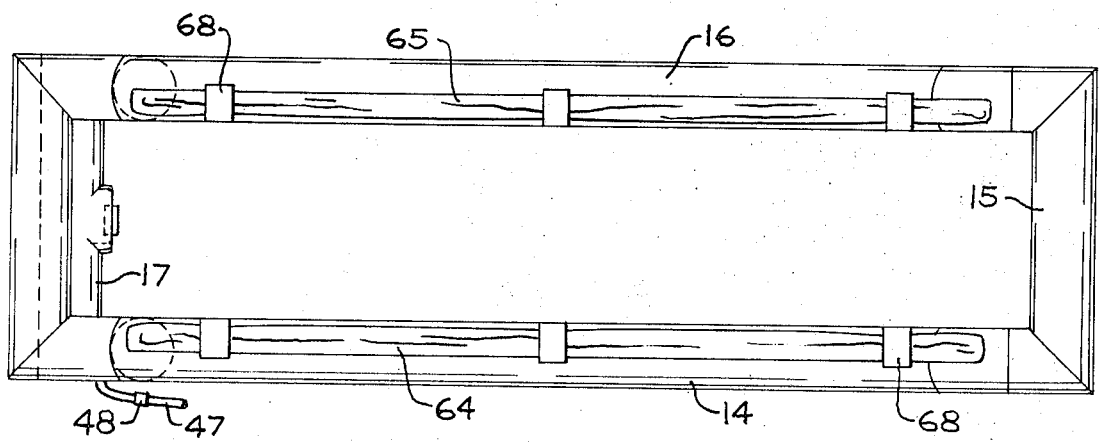
FIG. 5 is a fragmentary plan view of the upper section only of the escape slide.
Figure 8:
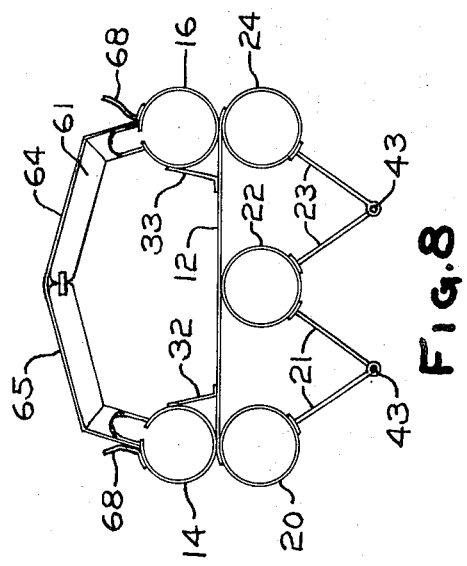
FIG. 8 is a cross-sectional view of the escape slide raft taken on lines 8—8 of FIG. 2 but with the canopy fully deployed.

Referring now to the drawings, wherein like reference characters designate like or corresponding parts throughout the several views, there is shown in FIGS. 1 and 2 an inflatable life raft escape slide 10 consisting of an upper section and a lower section that are suitably secured or bonded together to form a unitary slide 10. The upper section (FIGS. 5 and 6) of the slide 10 has a pair of longitudinally extending inflatable tube members 14 and 16 interconnected at the respective end portions by laterally extended tube members 15 and 17. The lower section of slide 10 has a plurality of longitudinally extending tube members 20, 22, and 24 interconnected by laterally extending tube members 26, 27, 28, 29, 30, and 31, wherein tube members 26 and 31 are at the respective end portions thereof. The upper and lower sections of slide 10 are interconnected by suitable bonding means to form a unitary whole. The slide 10 has a slide panel member 12 extending across the full length of the upper portion and, as depicted by FIG. 8, is sandwiched between the respective tube members 14–20 and 16–24 prior to the bonding of such upper and lower sections together to form the inflatable slide.

Figure 6:
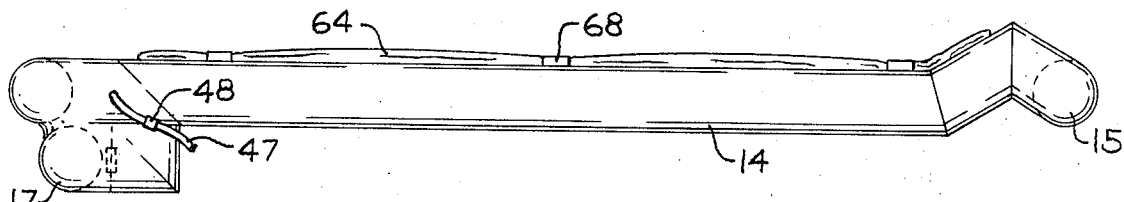
FIG. 6 is a fragmentary side elevational view of the upper section of the escape slide.
Figure 7:
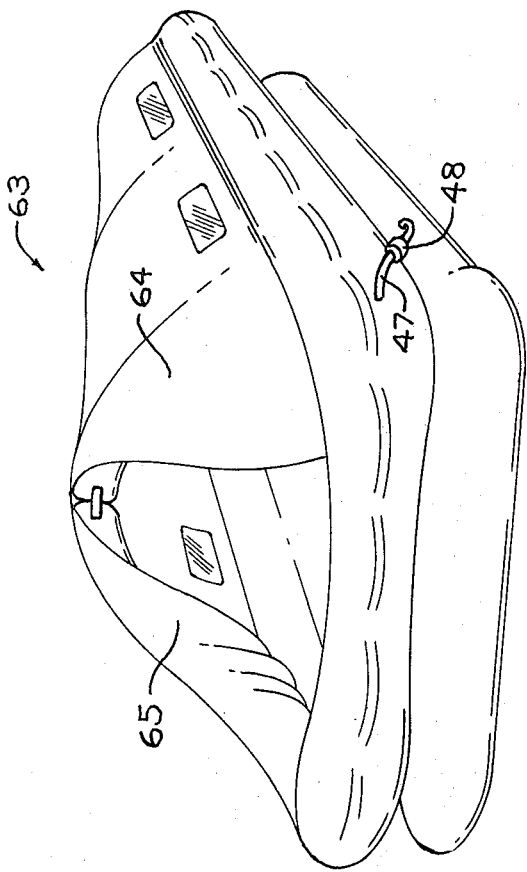
FIG. 7 is a perspective diagrammatic view of the inflatable escape slide in fully deployed condition as a raft.

The slide's tube members are fabricated from an air impervious preferably rubber coated material such that slide panel member 12 cooperates with the respective tube members 20 through 31 to provide a slide that is generally rectangular in cross section to assure a substantially flat and stable slide surface. A pair of spaced panel members 32–33 may be attached to the respective sides of tube members 14 and 16 and the slide panel member 12 to assure the smooth evacuation of passengers down the slide without endangering such passenger in his exit from a disabled aircraft. An inflatable pusher tube 35 (FIG. 2) is suitably secured to the lower portion of the slide 10 such that its upper portion of tube 35 forms a chamber 36 that is disposed between the respective tube members 17 and 26 of the respective upper and lower sections of slide 10 as shown in FIG. 2. Such chamber 36 of pusher tube 35 communicates with the respective tubes 26 and 17 via a one-way inlet valve 37 and 38 (FIG. 9) to control the pressurization of the respective upper and lower sections of slide 10. A suitable source of pressurized gas or air, such as a container or bottle of compressed gas 39, is mounted on the underside of slide 10, which bottle 39 is connected via a conduit 40 to an aspirator 41 located on the side portion of pusher tube 35. Suitable valve means 42 on conduit 40 controls the pressurization of the pusher tube 35. Manipulation of such valve 42 can be done via a lanyard, which, upon actuation, will inflate the respective upper and lower sections of the slide 10. Pusher tube 35 may have an aspirator 41 on either side to facilitate the rapid inflation of such slide 10. During the pressurization of such slide 10, aspirator 41 facilitates the pressurization thereof but upon completion of such pressurization, aspirator 41 permits the pusher tube 35 to deflate to improve its stability. Suitably mounted on the upper end portion of the slide 10 is an elongated U-shaped tube member 45 whose upper surface portion is substantially in line with the top surface portion of tube 14 when inflated. The U-shaped member 45 is a closed tube interconnected with tube 20 via conduit 47 and a valve 48 as shown in FIGS. 6 and 7. Tube 45 is in a deflated condition for evacuation or use as a slide and may, upon manipulation of the valve 48 and may bleed off sufficient air pressure from tube member 26 to distend the U-shaped tube 45 to protect the occupants of the raft from the elements and water spray. Suitably connected to the intermediate bottom surface of the lower portion of slide 10 are pairs of strut members 21—21 and 23—23. The upper portions of these strut members are suitably journaled to bosses that are bonded to the lower portions of tube members 20, 22, and 24 and with the respective other ends of such strut members being hinged to facilitate the packing of such slide 10 in its deflated condition into a compact package. A pair of cables 43 (only one visible in FIG. 2) extend from the forwardmost portion of slide 10 to the rearwardmost portion of such slide, having its intermediate portion secured to the respective hinge portions of struts 21—21 and 23—23. In the fully inflated condition of slide 10 such cables 43 and struts 21—21 and 23—23 operate to provide the necessary tension to the slide 10 to maintain it in a rigid condition for operation as an escape slide without interfering with its functioning as a raft since the displacement of the water is negligible. In lieu of the compressed gas container 39 separate inflation means or devices may be located on the aircraft and connected directly to the aspirators 41 to facilitate the pressurization of the slide 10. Such inflation devices are well known in the art.

Figure 9:
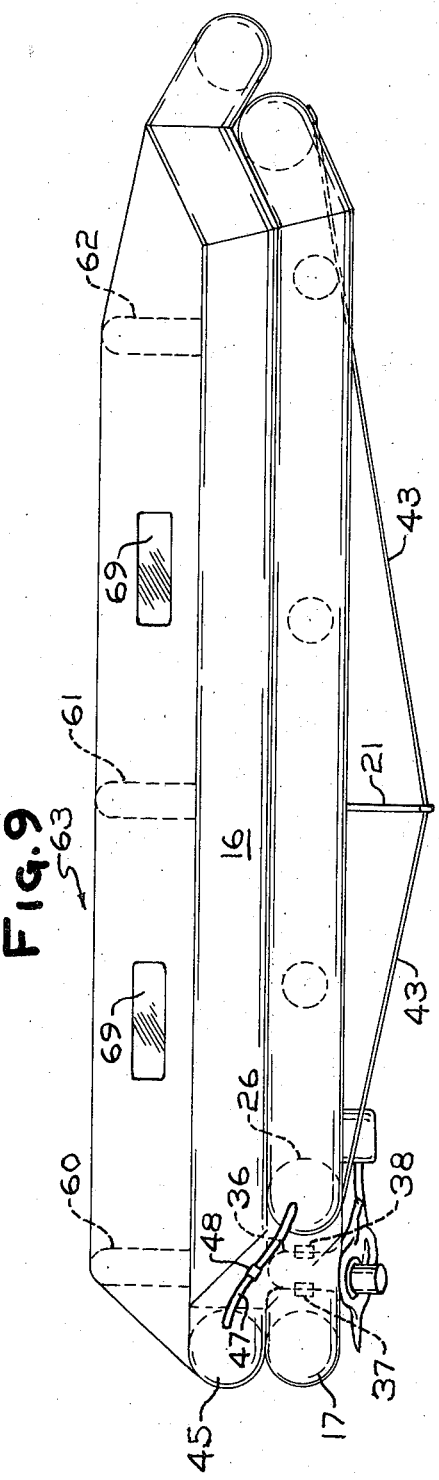
FIG. 9 is a side elevational view of the escape slide raft in fully inflated condition and with canopy deployed.

Tube members 16 of the upper section of slide 10 has three inflatable auxiliary tubular members 60, 61, 62, that cooperate with three similar inflatable tube members of tube member 14 to form three arcuate shaped arches for supporting a canopy indicated generally as 63 in FIG. 9. Canopy 63 is formed in two sections, one section 64 being supported by the inflatable auxiliary tube members 60, 61, 62 of tube member 16 while section 65 is supported by three inflatable tube members on tube member 14 similar to auxiliary members 60, 61, 62. During the storage condition, the respective canopy sections 65 and 64 are held in place on their respective tube members 14 and 16 by a plurality of tabs 68 made of "Velcro," pressure sensitive adhesive means of woven nylon fabric which are cooperative with other pads of "Velcro" to secure the panels in place. As seen in FIG. 8 the respective auxiliary tube members 60-62 communicate directly with the tube member 16 so that upon release of the canopy sections 64 and 65 from the "Velcro" tabs, such auxiliary tube members will inflate to support the canopy and shelter the occupants of the raft from the weather. Auxiliary tubular members 60, 61, and 62 and their adjacent auxiliary tubular members on tube member 14 may be interconnected by "Velcro" pads to provide for rigidity to the canopy. The panels 64 and 65 are provided with windows 69.

In utilizing the inflatable life raft escape slide 10, the slide 10 is folded into a relatively small package which is stored in a hidden compartment at the base of the exit door. The slide is attached to the aircraft by means of a suitable attachment strap 52. Such strap 52 may be readily removed in a manner old and well known in the art to permit the separation of the escape slide from the aircraft. When an aircraft becomes disabled and upon opening of the emergency exit doors such folded package falls out of the exit portion of the aircraft. Simultaneously with such action, the inflation device 39 is activated by a lanyard connected to valve 42 which communicates the pressurized gas via aspirator 42 to the pusher tube 35. Such pusher tube 35 quickly deploys the escape slide outwardly away from the disabled aircraft. The compressed gas via aspirator 42 and pusher tube 35 pressurizes the respective upper and lower sections of the escape slide via one-way valves 37 and 38. Valve 38 pressurizes the lower section of the slide via tube member 26 and tube member 20-22. The laterally extending tube members 27-28, 29 and 30 interconnecting the respective tube members 20 and 22, facilitate the rapid inflation of such tube members. The upper portion of slide 10 is inflated via one-way valve 37 and laterally extending tube 17. During the inflation of such slide 10 the struts 21-23 are quickly deployed and the cables 43 stabilize the struts and provide a rigid support as slide 10 becomes fully deployed. The escape slide in this condition is in position for use and upon evacuation of the passengers, the slide 10 is quickly deployed as a raft by the separation of the slide 10 from the aircraft by manipulation of strap 52, which positions the escape slide 10 into a horizontal position upon the surface of the water. Valve 48 is then actuated to bleed off a portion of the compressed air stored in the lower portion of the slide 10 to the U-shaped tube 45 which prevents the waves from coming into the raft although such structure would float as such. With the struts 21-23 displacing little water, and pusher tube 35 deflated, the raft is stable and fully operative as an escape life raft. To protect the occupants of the raft the "Velcro" tabs on tube members 14 and 16 are pulled to free the auxiliary tube members 61-64 and the auxiliary tube members on tube member 14, which auxiliary members thereby deploy the canopy. The tabs on the ends of the auxiliary tube members join the adjacent auxiliary tube members and provide a firm support for the canopy.

Various modifications are contemplated and may obviously be resorted to by those skilled in the art without departing from the described invention, as hereinafter defined by the appended claims, as only a preferred embodiment thereof has been disclosed.

I claim:

1. An inflatable life raft escape slide comprising an inflatable slide member; said slide member having an upper surface portion and a lower surface portion; said upper surface portion providing a slideway surface for the discharge of aircraft passengers; said slide member having a cross section with a width greater than the height thereof; said slide including a plurality of inflatable longitudinally extending tube members thereof, and laterally extending inflatable tube members communicating with said longitudinally extending members; an inflatable pusher tube member extending across the under surface of said slide to provide body and stability thereto; strut means having their one ends pivotally attached to the intermediate under surface portion of said slide; cables extending from the respective end portions of said slide for connection to the other ends of said struts to provide a rigid truss-like supporting means upon inflation of said slide; pressurizing means operative upon actuation to pressurize said pusher tube, said inflatable longitudinally extending tube members, and said inflatable laterally extending tube members; valve means interconnecting said pusher tube to said pressurizing means for inflating said pusher tube but operative upon exhaustion of pressure from said pressurizing means to deflate said pusher tube, an inflatable U-shaped tube mounted above said pusher tube and cooperative with said inflatable members upon inflation to provide an enclosure for said slide surface thereby presenting a boat-like structure;

valve means interconnecting said U-shaped tube and said inflatable members to bleed off pressurized air from said inflatable members to said U-shaped tube; inflatable arch member secured to the upper side portions of said slide member; releasable means confining said inflatable arch members in a deflated condition and upon actuation thereof communicating said arch members with said longitudinally extending members for inflation thereof; and canopy means connected to said arch members for deployment therewith to cover the slide surface of said slide on deployment of said arch members.

2. An inflatable escape slide raft as set forth in claim 1 wherein said longitudinally extending inflatable tube members communicate with spaced inflatable rail means for guiding and confining passengers on said slideway surface; said inflatable arch members comprising a plurality of auxiliary inflatable tube members on each of said inflatable rails, and means on one end of said auxiliary tubes for joining adjacent ends of said auxiliary tubes to form said arch members.

3. An inflatable life raft escape slide as set forth in claim 2 wherein said canopy comprises a pair of panel members deployable with said auxiliary inflatable tube members; and said pair of panel members cooperative with each other to cover the entire slide in spaced relationship with said slideway surface.

* * * * *